US006854178B2

(12) United States Patent
Fritsche et al.

(10) Patent No.: US 6,854,178 B2
(45) Date of Patent: Feb. 15, 2005

(54) THROUGH-THE-DRILL PLATE FASTENER INSTALLATION TOOL

(75) Inventors: David L. Fritsche, Foristell, MO (US); Thomas O. Blankenship, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 10/114,219

(22) Filed: Apr. 2, 2002

(65) Prior Publication Data

US 2003/0182786 A1 Oct. 2, 2003

(51) Int. Cl.[7] ................................................ B23Q 7/10

(52) U.S. Cl. .......................... 29/813; 29/809; 29/811.2; 29/525.1; 29/243.53; 227/110; 227/142

(58) Field of Search ......................... 29/243.53, 243.54, 29/809, 811.2, 813, 525.02, 525.06, 52.08, 525.11; 227/112, 138, 139, 110, 156, 142, 140; 72/453.17, 453.19; 408/1 R, 702, 712

(56) References Cited

U.S. PATENT DOCUMENTS 3,713,321 A * 1/1973 LaPointe ............... 29/243.524
3,750,257 A * 8/1973 Berecz ........................ 29/813
3,760,485 A * 9/1973 Smith .......................... 29/813
3,863,824 A * 2/1975 Bakoledis .................... 227/10
3,907,014 A * 9/1975 Manino ....................... 81/433
4,030,654 A * 6/1977 York .......................... 227/110
4,203,204 A * 5/1980 Murphy ....................... 29/469
4,310,964 A * 1/1982 Murphy ....................... 29/469
4,463,889 A * 8/1984 Sartran ....................... 227/112
4,478,112 A * 10/1984 Moulton .................... 81/57.37
4,581,964 A * 4/1986 Takatsuru .................... 81/464
4,615,206 A * 10/1986 Rosier ................... 29/243.523
4,637,539 A * 1/1987 Turcott et al. .............. 227/156
4,747,294 A * 5/1988 Schwartz et al. .......... 29/812.5
4,801,062 A * 1/1989 Austin ........................ 227/128
4,972,985 A * 11/1990 Smart et al. ................... 227/2
5,014,894 A * 5/1991 Smart ............................ 227/6
5,027,679 A * 7/1991 Kawashima et al. .......... 81/434
5,584,618 A 12/1996 Blankenship et al.
5,743,455 A * 4/1998 Holliday ..................... 227/142
5,803,338 A * 9/1998 Singer et al. .................. 227/8
5,927,919 A 7/1999 Blankenship et al.
5,947,654 A 9/1999 Blankenship et al.
6,000,596 A * 12/1999 Cariati ....................... 227/112
6,027,004 A * 2/2000 Ramella et al. ............. 227/136
6,079,604 A * 6/2000 Banducci et al. ........... 227/112
6,125,680 A * 10/2000 Bradbury et al. .......... 72/391.6
6,256,854 B1 * 7/2001 Chitty et al. ............. 29/243.53
6,296,426 B1 10/2001 King et al.
6,368,031 B1 4/2002 Martinek et al.
6,371,701 B1 4/2002 Blankenship et al.
6,631,827 B2 * 10/2003 Goodsmith et al. ......... 221/238

FOREIGN PATENT DOCUMENTS

EP 285739 A1 * 10/1988 ............ B21J/15/34

OTHER PUBLICATIONS

Hi–Shear Thru–the–Drill Plate Fastener Installation Tool with Initial Modifications Model # HLA1137.

* cited by examiner

*Primary Examiner*—Essama Omgba
(74) *Attorney, Agent, or Firm*—Harness, Dickey & Pierce, P.L.C.

(57) ABSTRACT

A fastener installation tool that is configured to feed fasteners from a magazine assembly into a housing where one of the fasteners is aligned to a reciprocating tool bit. The fastener installation tool is configured to set the fastener into a workpiece such that the head of the fastener is spaced apart from the surface of the workpiece by a predetermined amount. A method for coupling a first workpiece to a second workpiece is also provided.

9 Claims, 13 Drawing Sheets

Figure - 13
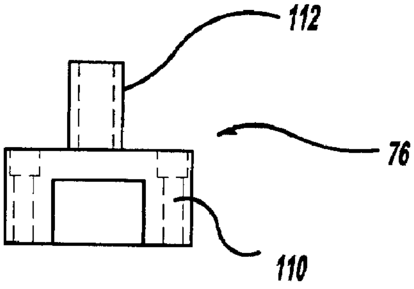
Figure - 14
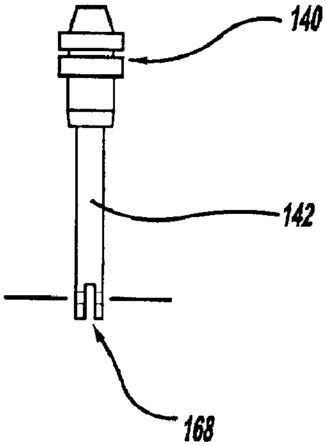
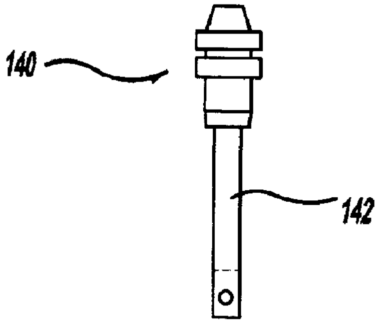
Figure - 15

THROUGH-THE-DRILL PLATE FASTENER INSTALLATION TOOL

FIELD OF THE INVENTION

The present invention generally relates to fixtures and tooling for the fabrication and assembly of structures with the aid of a drill plate or other tooling and more particularly to a fastener installation tool that is suited for use with tooling such as drill plates.

BACKGROUND OF THE INVENTION

The construction and assembly of equipment, such as aircraft, frequently entails drilling holes to accommodate fasteners in structures and fabricating countersinks in such holes to seat the countersunk heads of low-profile fasteners. It is typically important that such holes and countersinks be located accurately and that they be fabricated precisely. In high-volume fabrication operations requiring the fabrication of large numbers of holes and countersinks, it is often important that the time to accomplish such fabrication operations be minimized so as to minimize cost and that such fabrication operations be repeatable.

It is conventional in the construction and assembly of equipment with many sets of holes and countersinks to drill many holes in succession using a drill plate. The drill plate, which has one or more accurately positioned holes that extend therethrough, is aligned and secured to a workpiece such that the desired location of the holes in the workpiece correspond to the holes in the drill plate. In some instances, it is desirable to attach the drill motor to the drill plate so that the operator does not have to counteract the full weight of the drill motor and, where the drill motor is equipped with a self-feeding mechanism, counteract the thrust that is produced by the self-feeding mechanism.

It is conventional to remove such drill plates after the formation of the holes and countersinks to permit the fasteners to be inserted into the holes via unguided hand-held rivet guns. As those skilled in the art will understand, construction of equipment in this manner is not always desirable in that the uncoupling of the drill plate permits the workpieces to shift relative to one another. This shifting has been known to initiate the presence of gaps between the workpieces and/or to adversely affect the orientation of the workpieces relative to one another. Furthermore, the use of unguided hand-held rivet guns increases the possibility that the surface of one of the workpieces will become damaged through contact with the rivet guns' reciprocating installation tool and/or prolonged driving of the head of the fastener into the surface of the workpiece.

Accordingly, there remains a need in the art for an improved fastener installation tool that can be used in conjunction with drill plates and other such tooling in a manner that overcomes the aforementioned drawbacks.

SUMMARY OF THE INVENTION

In one preferred form, the present invention provides a fastener installation tool for feeding a threaded fastener, which has a head, into a hole formed in a workpiece. The fastener installation tool includes a tool body, a magazine assembly, a fastener feed mechanism and a controller. The tool body has a reciprocating portion that is aligned along a longitudinal axis of the tool body. The magazine assembly is coupled to the tool body and has a dispensing end that is aligned to an axis that is parallel to the longitudinal axis of the tool body. The magazine assembly is configured to hold a plurality of the threaded fasteners and to dispense one of the threaded fasteners into the dispensing end. The fastener feed mechanism is coupled to the tool body and the magazine assembly and includes a fastener gripper that is movable between an extended condition, wherein the fastener gripper is aligned to the dispensing end of the magazine assembly to receive the fastener, and a retracted portion, wherein the fastener gripper is aligned to the reciprocating portion such that a longitudinal axis of the threaded fastener is coincident with the longitudinal axis of the tool body. The controller controls the fastener feed mechanism and is operable in a first condition for maintaining the fastener gripper in the retracted condition, and a second condition for maintaining the fastener gripper in the extended condition.

In another preferred form, the present invention provides a method for coupling a first workpiece to a second workpiece. The method includes: providing a drill plate having an aperture; aligning the drill plate to the first and second workpieces such that the aperture is positioned in a predetermined manner relative to at least one of the first and second workpieces; securing the drill plate to the first and second workpieces such that the drill plate abuts the surface of the first workpiece; forming a hole through the first and second workpieces, the hole being aligned in a predetermined manner relative to the aperture in the drill plate; providing a threaded fastener having a head; inserting the threaded fastener into the aperture and the hole; and impacting the head of the threaded fastener with a reciprocating fastener installation tool 10 until the head is offset from the surface of the first workpiece such that a predetermined amount of clearance exists between the head and the surface of the first workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 13 is a top view of the nose piece;

FIG. 14 is a side view of a portion of the fastener feed mechanism illustrating a portion of the rod assembly in greater detail;

FIG. 15 is a front view of a portion of the rod assembly;

DETAILED DESCRIPTION OF THE PREFERRED EMBODIMENTS

Figure 1:
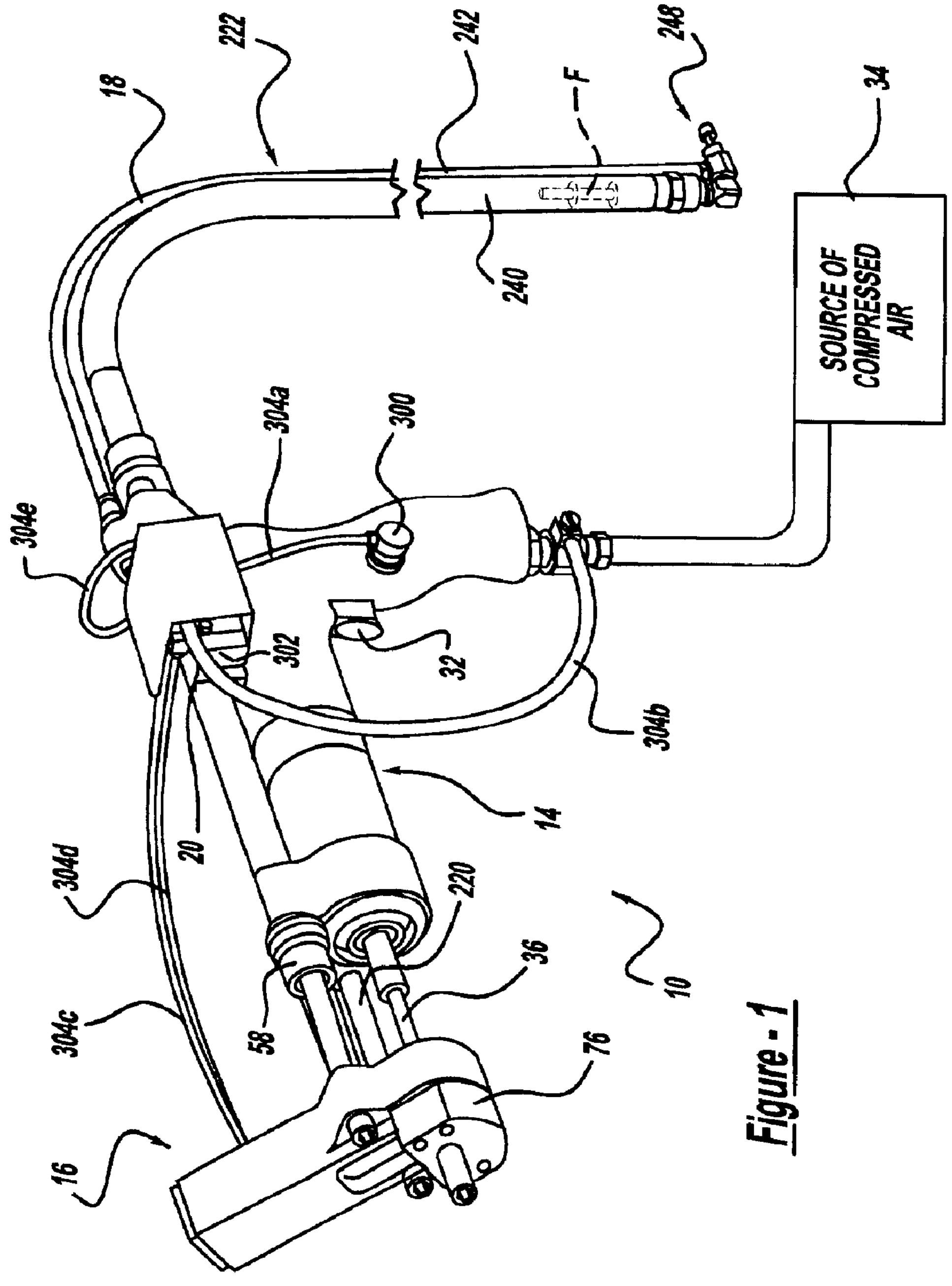
FIG. 1 is a perspective view of a fastener installation tool constructed in accordance with the teachings of the present invention.
Figure 2:
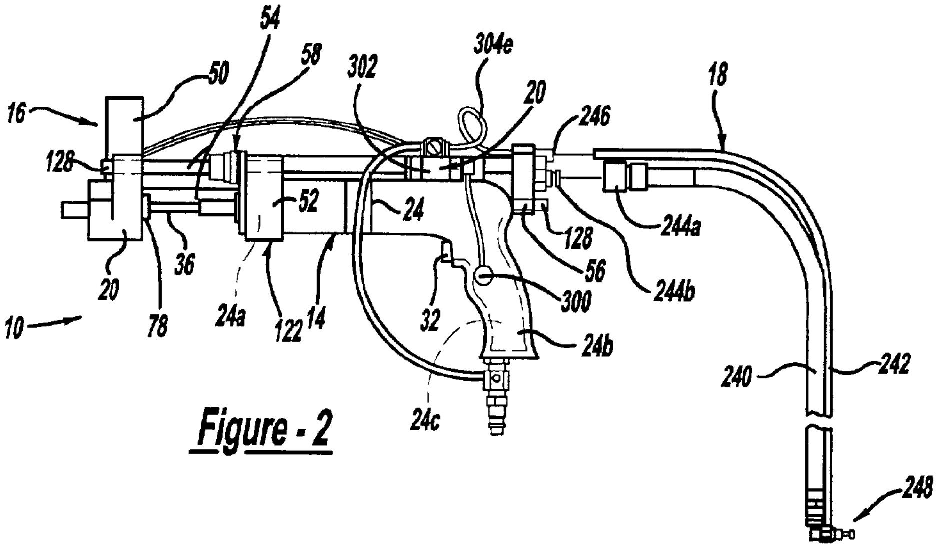
FIG. 2 is a side view of the fastener installation tool of FIG. 1.
Figure 3:
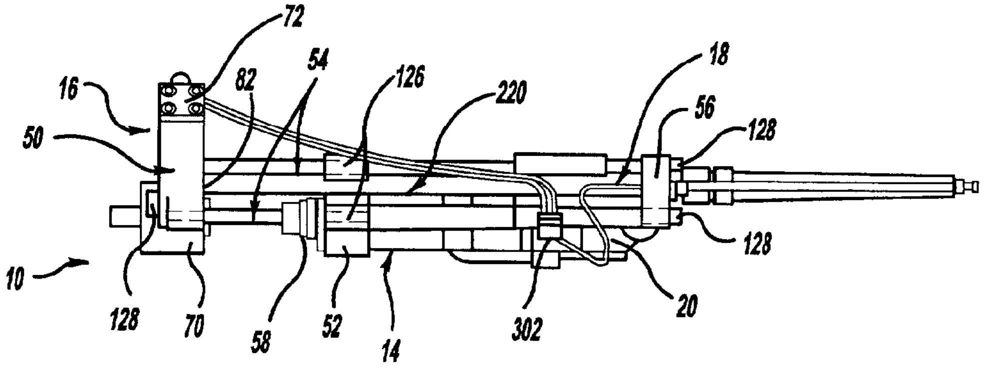
FIG. 3 is a top view of the fastener installation tool of FIG. 1.

With reference to FIGS. 1 through 3 of the drawings, a fastener installation tool constructed in accordance with the teachings of the present invention is generally indicated by reference numeral 10. The fastener installation tool 10 is illustrated to include a tool body 14, a fastener feed mechanism 16, a magazine assembly 18, and a controller 20.

Figure 4:
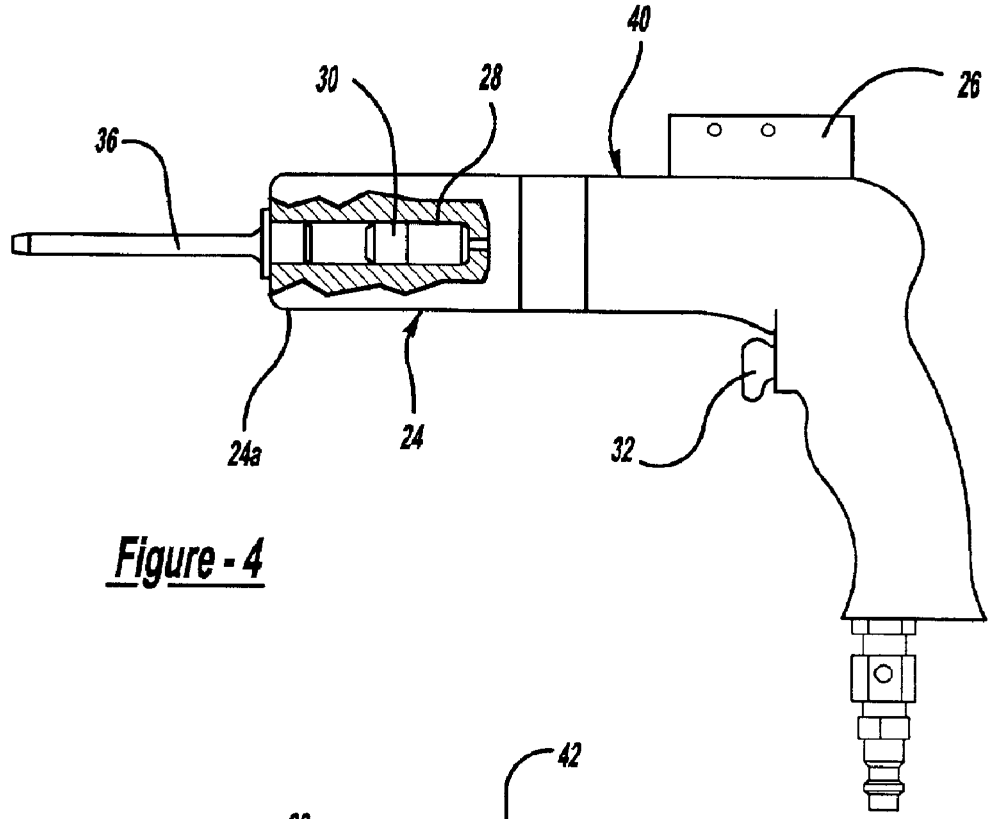
FIG. 4 is a side view of a portion of the fastener installation tool of FIG. 1 illustrating the tool body in greater detail.
Figure 5:
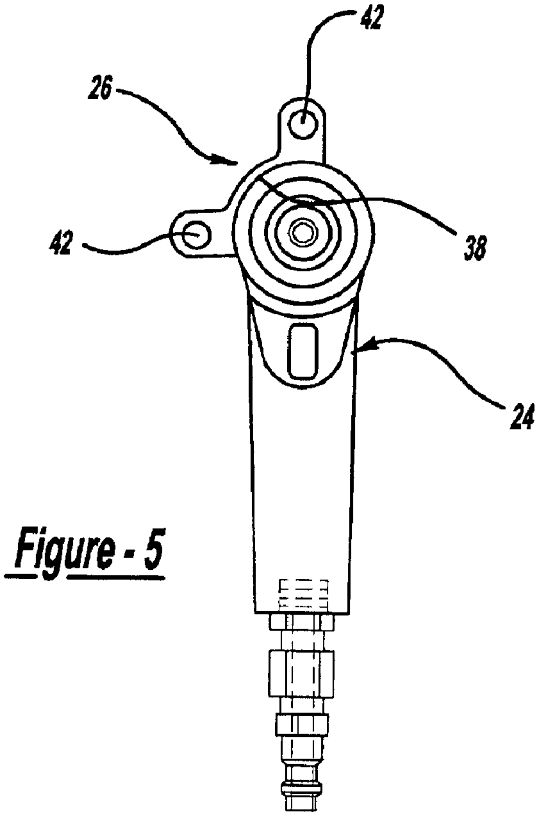
FIG. 5 is a front view of a portion of the fastener installation tool of FIG. 1 illustrating the tool body in greater detail.

With reference to FIGS. 4 and 5, the tool body 14 includes a rivet gun 24 and a mounting plate 26. Aside from the modifications detailed herein, the rivet gun 24 is conventional in its construction and operation. In this regard, the rivet gun 24 includes a cylinder 28 in which a piston 30 is slidably disposed. A primary trigger 32 is employed to selectively couple a source of compressed air 34 (FIG. 1) to the cylinder 28 to thereby cause the piston 30 to reciprocate in the cylinder 28. A tool bit 36, which is coupled to the nose 24*a* of the rivet gun 24, is struck by the piston 30 when the piston 30 travels forwardly in the cylinder 28.

The mounting plate 26 includes an interior surface 38 that is contoured to match the exterior surface 40 of the rivet gun 24. A pair of rear rod apertures 42 are machined longitudinally through the mounting plate 26 and serve to support the fastener feed mechanism 16. The mounting plate 26 may be fixed to the rivet gun 24 in any conventional manner, but is preferably secured thereto via one or more welds. As the load on the mounting plate 26 is not severe, a stitch weld (i.e., a series of spaced apart welds) is preferred so as to reduce the amount of heat that is transmitted to the rivet gun 24 during the welding process.

With reference to FIGS. 2, 3, 6 and 7, the fastener feed mechanism 16 is illustrated to include a housing assembly 50, a feed mechanism mounting plate 52, a pair of attachment rods 54, an end structure 56, a depth limiting device 58, a piston assembly 60 and a guide assembly 62. The housing assembly 50 includes a housing shell 70, a cylinder end cap 72, an end cap seal 74, a nose piece 76 and a tool bushing 78.

With reference to FIGS. 6 through 10, the housing shell 70 is illustrated to define a cylinder bore 80, a fastener inlet aperture 82, and a guide cavity 84 and includes a pair of attachment rod apertures 86 that are formed through the housing shell 70 and sized to receive the attachment rods 54. The cylinder bore 80 is cylindrically shaped and extends through a distal end of the housing shell 70. The end cap seal 74, which is an O-ring seal in the example provided, is disposed between the distal end of the housing shell 70 and the cylinder end cap 72 to close off the distal end of the cylinder bore 80. An upper port 90 and a lower port 92 are formed through the housing shell 70 and intersect the cylinder bore 80. The upper and lower ports 90 and 92 permit the introduction and removal of air from the cylinder bore 80 in a manner that will be described in greater detail, below. The proximal end of the cylinder bore 80 terminates at a wall 94 through which a rod bore 96 is formed.

A U-shaped slot 98 is formed in the front side of the housing shell 70 below the wall 94 and intersects the guide cavity 84. the fastener inlet aperture 82 is formed in the rear side of the housing shell 70 and intersects the U-shaped slot 98. The guide cavity 84 includes an arcuate end wall 95 and a guide bore 100 that is formed through the housing shell 70 along an axis that is parallel the axis of the fastener inlet aperture 82.

With reference to FIGS. 6 through 8 and 11 through 13, the nose piece 76 is illustrated to be removably coupled to the forward side of the housing shell 70 via conventional threaded fasteners (not specifically shown) and includes a body 110, which surrounds the front, sides and bottom of the guide cavity 84, and a tubular collar 112, which protrudes from a front side of the body 110. The tubular collar 112 has an inner diameter that is aligned to the guide bore 100 that is formed through the housing shell 70 and sized to receive therethrough a fastener of a predetermined size. The tubular collar 112 is also sized in its outer diameter to engage in a slip fit manner an aperture that is formed in a drill plate. In the particular embodiment illustrated, the nose piece 76 is unitarily formed, but those skilled in the art will understand that tubular collar 112 may also be a discrete element, which is formed as a headed bushing and removably coupled to the body 110. Configuration of the nose piece 76 in this latter manner permits the tubular collar 112 to be replaced should it experience significant wear or the fastener installation tool 10 be employed for installing a differently sized fastener.

Figure 7:
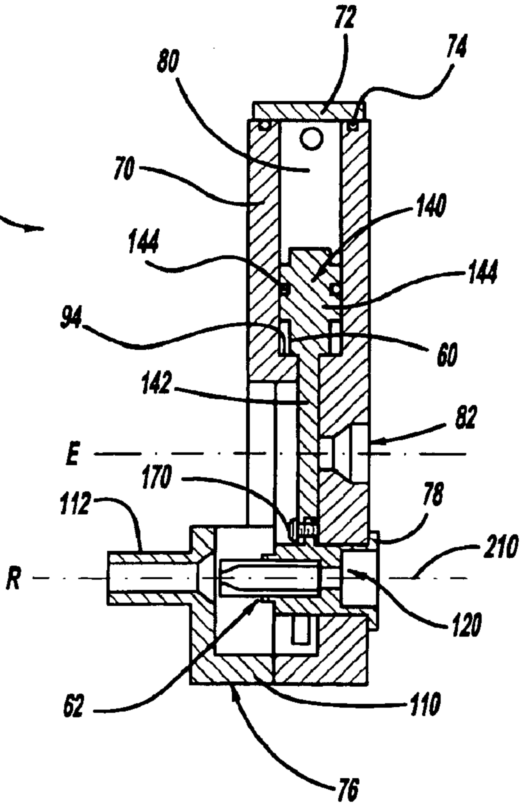
FIG. 7 is a sectional view of the fastener feed mechanism taken along the line 7—7 of FIG. 6.
Figure 8:
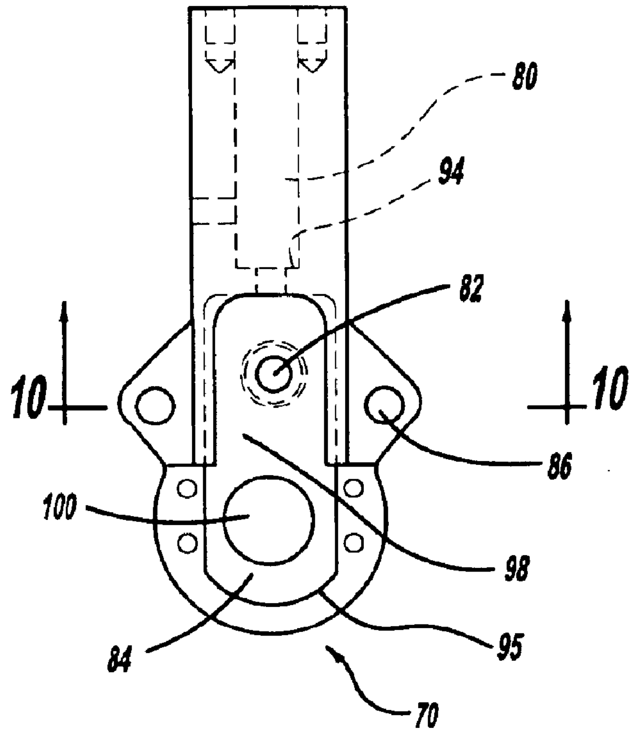
FIG. 8 is a front view of a portion of the fastener feed mechanism illustrating the housing shell in greater detail.
Figure 9:
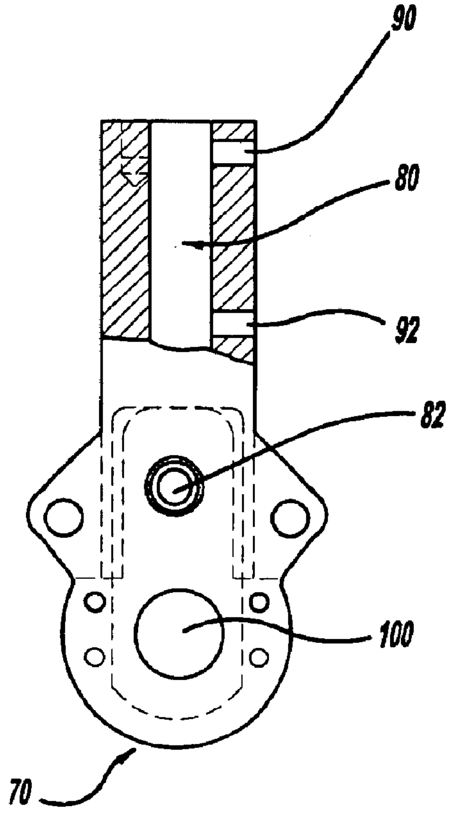
FIG. 9 is a rear view in partial section of the housing shell.
Figure 10:
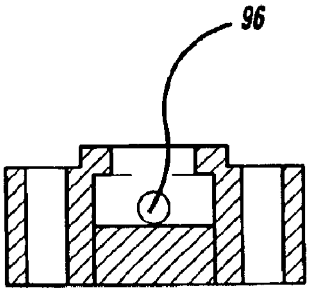
FIG. 10 is a sectional view of the housing shell taken along the line 10—10 of FIG. 8.
Figure 11:
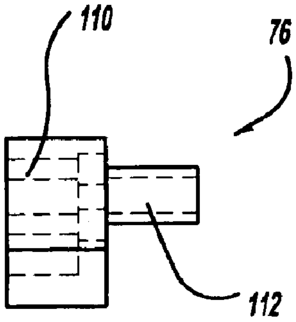
FIG. 11 is a side view of a portion of the fastener feed mechanism illustrating the nose piece in greater detail.
Figure 12:
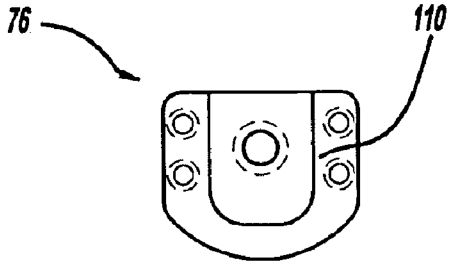
FIG. 12 is a rear view of the nose piece.

With specific reference to FIGS. 2, 7 and 8, the tool bushing 78 is coupled to the rear side of the housing shell 70, extending through the guide bore 100 and engaging the housing shell 70 in a press-fit manner. The tool bushing 78 is an annular member, having a guide aperture 120 formed through its axis and aligned generally concentrically with the tubular collar 112.

Returning to FIGS. 1 through 3, the feed mechanism mounting plate 52 is coupled to the nose 24*a* of the rivet gun 24 through a conventional means, such as one or more set screws 122. The feed mechanism mounting plate 52 includes a central bore (not specifically shown), through which the nose 24*a* of the rivet gun 24 extends, and a pair of front rod apertures 126, each of which having an axis that is generally parallel to and circumferentially offset from the axis of the central bore.

The attachment rods 54 are illustrated to be tubular in their construction, each of which having opposite ends that are threaded to receive a threaded fastener 128. The feed mechanism mounting plate 52 is aligned to the nose 24*a* of the rivet gun 24 such that each of the attachment rods 54 is slidably received into an associated pair of the front and rear rod apertures 126 and 42. A threaded fastener 128 is disposed through each of the attachment rod apertures 86 that are formed through the housing shell 70 and threadably engaged to the threaded ends of the attachment rods 54. The opposite threaded ends of the attachment rods 54 are disposed through attachment rod apertures (not specifically shown) formed in the end structure 56 and threaded fasteners 128 are employed to fixedly secure the attachment rods 54 to the end structure 56. With the attachment rods 54 disposed in the front and rear rod apertures 126 and 42 in a sliding, slip-fit manner and fixedly coupled to the housing shell 70 and the end structure 56, the fastener feed mechanism 16 is able to move along the longitudinal axis of the rivet gun 24.

The depth limiting device 58 is operable for limiting the amount by which the housing shell 70 can travel rearwardly toward the nose 24*a* of the rivet gun 24. The depth limiting device 58 may be of any type, such as a member that is fixedly coupled to the housing shell 70, the feed mechanism mounting plate 52 or even one or more of the attachment rods 54. The depth limiting device 58 is, however, preferably adjustable. In the particular embodiment illustrated, the depth limiting device 58 is a microstop device that is commercially available from Monogram Aerospace Fasteners of Los Angles, Calif.

Figure 6:
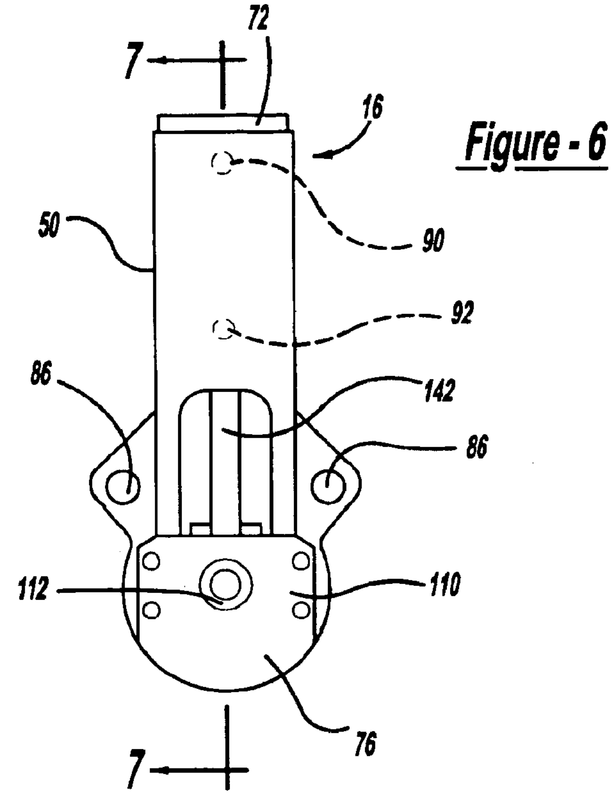
FIG. 6 if a front view of a portion of the fastener installation tool of FIG. 1 illustrating the fastener feed mechanism in greater detail.

With renewed reference to FIGS. 6 and 7, and with additional reference to FIGS. 14 and 15, the piston assembly 60 is shown to include a piston 140, a rod 142 and a ring seal 144. In the particular embodiment illustrated, the piston 140 and the rod 142 are unitarily formed, but those skilled in the art will appreciate that these components may be separately formed and thereafter joined together. The ring seal 144, which is illustrated to be a conventional O-ring, is fitted around the piston 140 and the piston 140 is movably disposed in the cylinder bore 80 between the upper and lower ports 90 and 92. The rod 142 is fixedly coupled to an end of the piston 140 and extends through the rod bore 96 and into the guide cavity 84.

Figure 16:
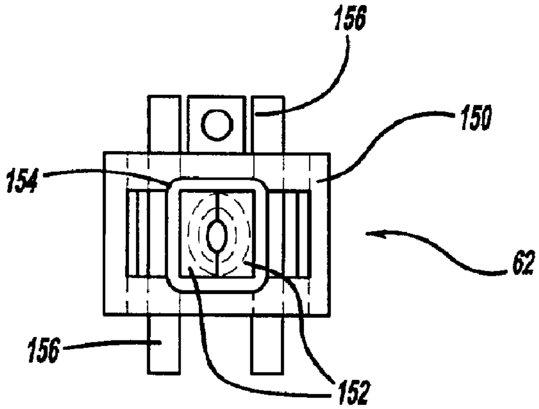
FIG. 16 is a front view of a portion of the fastener feed mechanism illustrating the guide assembly in greater detail.
Figure 17:
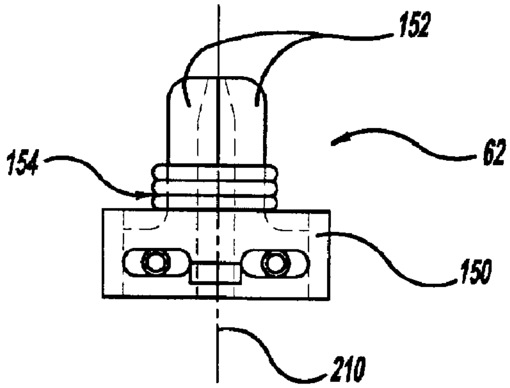
FIG. 17 is a bottom view of the guide assembly.
Figure 18:
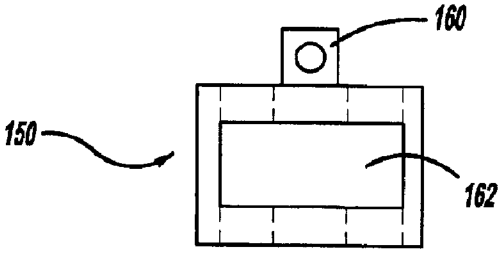
FIG. 18 is a front view of a portion of the guide assembly illustrating the mounting block in greater detail.
Figure 19:
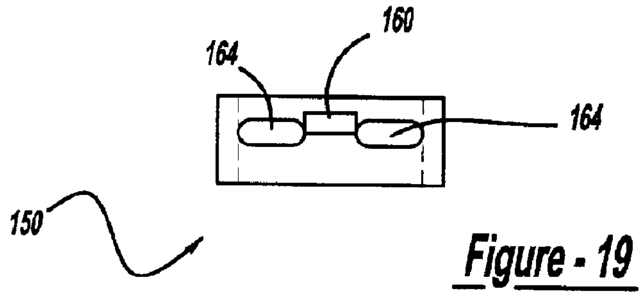
FIG. 19 is a top view of the mounting block.

With reference to FIGS. 7, 16 and 17, the guide assembly 62 is shown to include a mounting block 150, a pair of fingers 152, a spring device 154 and a pair of coupling pins 156. In FIGS. 18 and 19, the mounting block 150 is illustrated to include a tang 160, a finger aperture 162 and a pair of finger pivot apertures 164. The tang 160 is sized to fit into a slot 168 (FIG. 14) that is formed in the end of the rod 142 opposite the piston 140. A screw 170, which is inserted through the tang 160 and threadably engaged to the rod 142, is employed to couple the guide assembly 62 to the piston assembly 60. The finger aperture 162 is illustrated to be generally rectangular in cross section and extend completely through the mounting block 150. The finger pivot apertures 164, which are illustrated to be slotted in the example provided, extend through the mounting block 150 in a direction that is perpendicular to the finger aperture 162.

Figure 20:
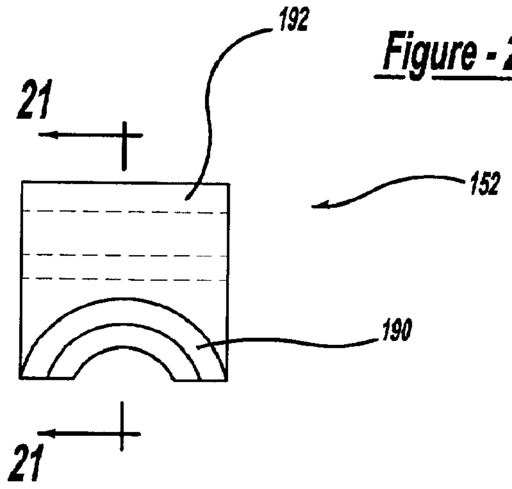
FIG. 20 is a front view of a portion of the guide assembly illustrating one of the fingers in greater detail.
Figure 21:
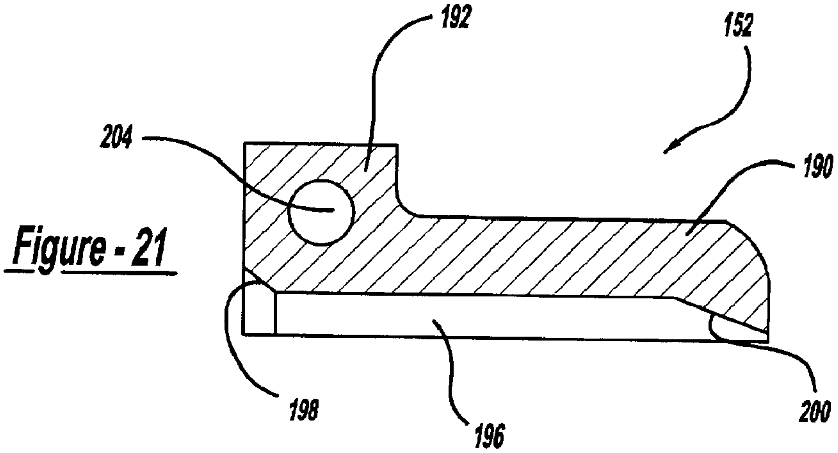
FIG. 21 is a sectional view of one of the fingers taken along the line 21—21 of FIG. 20.
Figure 22:
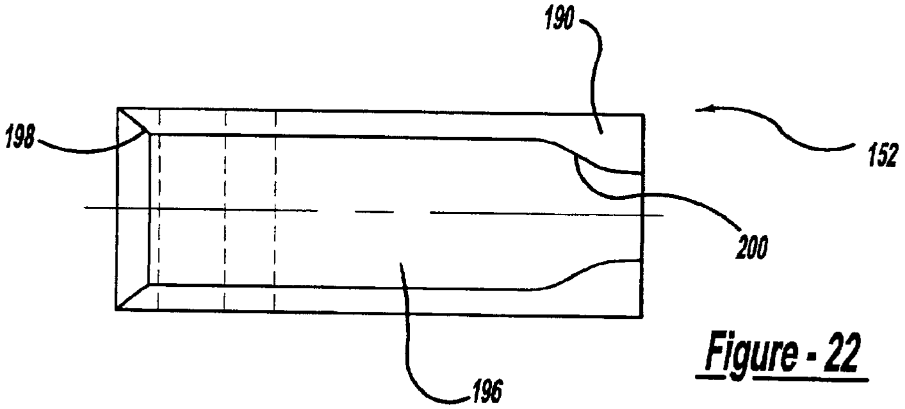
FIG. 22 is a side view of one of the fingers.
Figure 23:
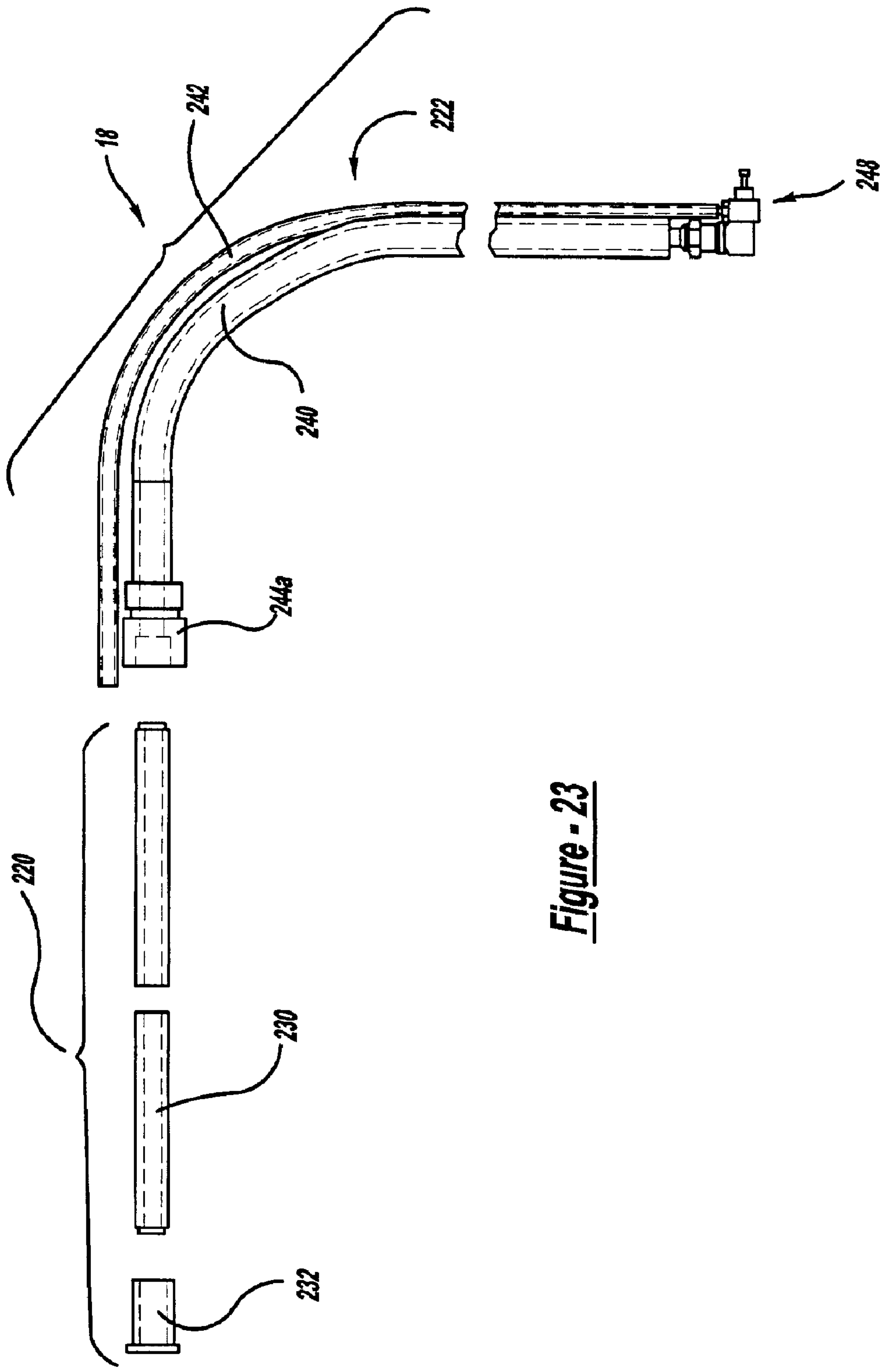
FIG. 23 is a partially exploded side view of a portion of the fastener installation tool of FIG. 1 illustrating the magazine assembly in greater detail.
Figure 24:
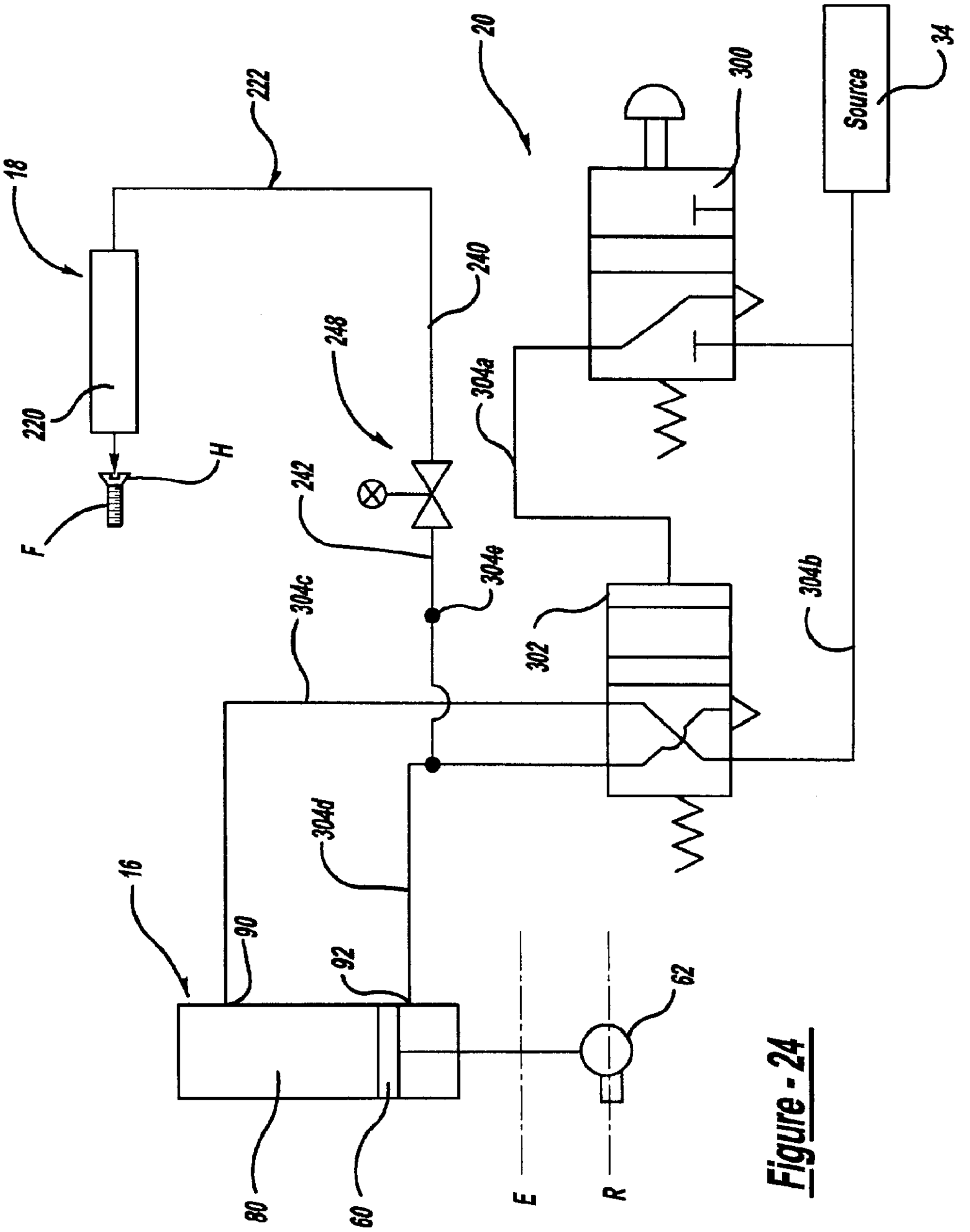
FIG. 24 is a schematic illustration of a portion of the fastener installation tool of FIG. 1 illustrating the controller in greater detail.
Figure 25:
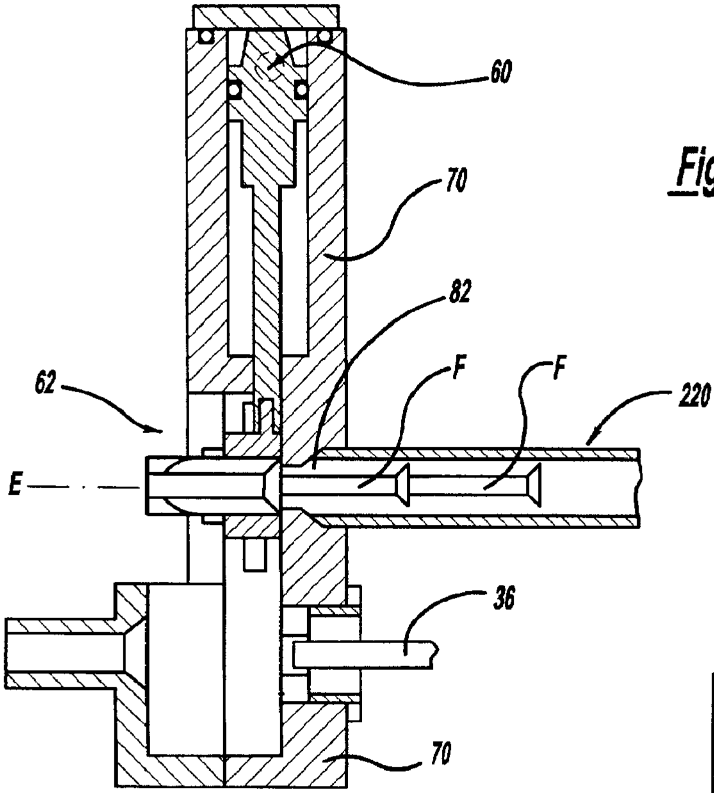
FIG. 25 is a sectional view similar to that of FIG. 7 but illustrating the guide assembly in the extended position and receiving a fastener from the magazine assembly.

The fingers 152 are constructed in mirror image and as such, only one of the fingers 152 will be discussed in detail. In FIGS. 20 through 22, the finger 152 is illustrated to include a guide portion 190 and a mounting portion 192. The guide portion 190 is generally semi-cylindrically shaped and having a cross-section that has the shape of a circular segment that terminates prior to the centerpoint of the radius that defines the outer edge of the circular segment. The guide portion 190 includes a longitudinally extending fastener guide bore 196 that is formed through the guide portion 190 and which includes a chamfered leading edge 198 and a trailing edge 200. The trailing edge 200 tapers radially inwardly in an increasing manner toward the front end of the finger 152 until the diameter of the fastener guide bore 196 is equivalent to a predetermined minimum diameter, such as a diameter that is greater than about 0.020 inch greater than the major diameter of the fastener that is to be cycled through the fastener feed mechanism 16.

The mounting portion 192 is a rectangular lug that is mounted to a side of the guide portion 190 opposite the fastener guide bore 196. A pivot pin aperture 204 is formed through the mounting portion 192 in a direction that is generally perpendicular to the fastener guide bore 196. Those skilled in the art will understand that the fingers 152 may be fabricated together from a single piece of stock and thereafter severed with a saw or severing tool.

With renewed reference to FIGS. 7 and 16 through 22, the fingers 152 are disposed in the finger aperture 162 of the mounting block 150 and the coupling pins 156, which are illustrated to be roll or spring pins, are driven through both the finger pivot apertures 164 and the pivot pin apertures 204 to couple the fingers 152 to the mounting block 150 in a manner that permits each finger 152 to both pivot relative to the mounting block 150 and slide in a lateral direction. The spring device 154, which is illustrated to be a pair of O-rings that are engaged to the guide portion 190 of the fingers 152 forwardly of the mounting block 150, operatively bias the fingers 152 toward one another about a common centerline 210 (FIG. 17).

With the guide assembly 62 coupled to the piston assembly 60 and housed in the housing assembly 50, the guide assembly 62 translates in the U-shaped slot 98 between a retracted position (designated by reference letter R in FIG. 7), wherein the centerline 210 of the fingers 152 is aligned to the tubular collar 112 and the guide bore 100, and an extended position (designated by reference letter E in FIG. 7), wherein the centerline 210 of the fingers 152 is aligned to the fastener inlet aperture 82.

With reference to FIGS. 1 through 3 and 23, the magazine assembly 18 is illustrated to include a first feed tube assembly 220 and a second feed tube assembly 222. The first feed tube assembly 220 is disposed between the housing shell 70 and the end structure 56 and aligned to the fastener inlet aperture 82 in a manner that is generally parallel to the attachment rods 54. In the example provided, the first feed tube assembly 220 includes a tubular body 230 and at least one insert 232 that is fitted into the inside diameter of the tubular body 230 proximate an end of the tubular body 230. As the first feed tube assembly 220 is preferably press fit into the fastener inlet aperture 82, the insert 232 strengthens the end of the tubular body 230 and prevents the tubular body 230 from being crushed as the first feed tube assembly 220 is coupled to the housing shell 70. Preferably, an insert (not shown) is also employed in conjunction with the opposite end of the tubular body 230, which is inserted into an aperture (not specifically shown) that is formed partially through the end structure 56.

The second feed tube assembly 222 includes a feed tube 240 and an air line 242 for supplying a source of compressed air to a distal end of the feed tube 240. The proximal end of the feed tube 240 is preferably releasably and removably coupled to the end structure 56 to permit a supply of fasteners to be introduced into the feed tube 240. In the example provided, the feed tube 240 and the end structure 56 are releasably coupled through a pair of mating couplings 244*a* and 244*b*, with the coupling 244*a* being fixedly coupled to the feed tube 240 and the coupling 244*b* being fixedly coupled to the end structure 56. The proximal end of the air line 242 is coupled to a supply manifold 246 and receives compressed air from a source of compressed air in a manner that is controlled by the controller 20. The distal end of the air line 242 is coupled to a throttling or pressure regulating device that meters or regulates the air that flows into the distal end of the feed tube 240. In the example provided, a commercially available needle valve 248, such as a MNV-1K needle valve manufactured by the Clippard Instrument Laboratory is employed, primarily due to its relatively small size and weight.

With reference to FIGS. 1 through 3 and 24, the controller 20 is illustrated to include a feed mechanism trigger 300, a directional valve 302 and a plurality of fluid conduits (e.g., 304*a*, 304*b*) for linking together the various elements of the controller 20 with the source of compressed air 34, the feed mechanism trigger 300, the directional valve 302, the fastener feed mechanism 16 and the magazine assembly 18. The feed mechanism trigger 300, is a conventional two position, three-way, manually actuated, spring-return valve that is coupled to the handle 24*b* of the rivet gun 24 proximate the trigger 32 such that the feed mechanism trigger 300 is fixedly coupled to the handle 24*b* and coupled in fluid connection to the hollow cavity 24*c* of the handle 24*b*. The hollow cavity 24*c* of the handle 24*b* is conventionally employed to route compressed air to motor that powers the reciprocating piston 30 (FIG. 4) of the rivet gun 24. Coupling of the feed mechanism trigger 300 to the handle 24*b* in this manner permits the user of the fastener installation tool 10 to actuate the feed mechanism trigger 300 with their thumb. The feed mechanism trigger 300 is operable in an unactuated condition, wherein the source of compressed air 34 is blocked and a conduit 304*a* that connects the feed mechanism trigger 300 to the directional valve 302 is vented to the atmosphere, and an actuated condition, wherein conduit 304*a* couples the source of compressed air 34 to the directional valve 302. The spring-return feature of the feed mechanism trigger 300 biases it into the unactuated condition.

In the example provided, the directional valve 302 is a commercially available two position, four-way, pilot-actuated, spring-return valve. A conduit 304*b* couples the directional valve 302 to the source of compressed air 34 and conduits 304*c* and 304*d* couple the directional valve 302 to the upper and lower ports 90 and 92, respectively. The directional valve 302 is also operable in an unactuated condition and an actuated condition, and its state or condition is dependent upon the state of the feed mechanism trigger 300. When the feed mechanism trigger 300 is in the unactuated state, the pressure of the fluid in the conduit 304*a* is at atmospheric conditions, and the spring-return feature of the directional valve 302 biases the directional valve 302 into the unactuated condition wherein the source of compressed air 34 is coupled via conduit 304*c* to the upper port 90 and the lower port 92 is vented to the atmosphere via conduit 304*d* to thereby urge the piston assembly 60 downwardly in the cylinder bore 80 so that the guide assembly 62 is maintained in the retracted position R.

When the feed mechanism trigger 300 is in the actuated state and the pressure of the fluid in the conduit 304*a* sufficiently overcomes the biasing force of the spring-return feature of the directional valve 302, the directional valve 302 shifts into the actuated condition wherein the source of compressed air 34 is coupled via conduit 304*d* to the lower port 92 and the upper port 90 is vented to the atmosphere via conduit 304*c* to thereby urge the piston assembly 60 upwardly so that the guide assembly 62 is maintained in the extended position. Furthermore, as the conduit 304*e* is in fluid connection with the conduit 304*d*, the positioning of the directional valve 302 in the actuated condition operably supplies compressed air to the air line 242 that is coupled to the distal end of the feed tube 240.

With reference to FIGS. 1 and 24 through 26, fasteners F (FIG. 24) are loaded into the feed tube 240 and the second feed tube assembly 222 is coupled to the first feed tube assembly 220. The rivet gun 24 is then coupled to the source of compressed air 34 and the feed mechanism trigger 300 is actuated, causing the guide assembly 62 to rise to the extended position E. Simultaneous with the movement of the guide assembly 62, compressed air travels from the conduit 304*e* through the air line 242 and into contact with fasteners F that are disposed in the feed tube 240. As the end of the first feed tube assembly 220 is open to the atmosphere, the pressure differential across the first and second feed tube assemblies 220 and 222 pushes the fasteners F toward the housing shell 70 until one of the fasteners F is pushed through the fastener inlet aperture 82 in the housing shell 70 and between the fingers 152 in the guide assembly 62. With a fastener F thus loaded into the guide assembly 62, further motion of the fasteners F in the magazine assembly 18 is inhibited.

Thereafter, the feed mechanism trigger 300 is released, causing the feed mechanism trigger 300 and the directional valve 302 to revert to their unactuated states and place the loaded guide assembly 62 into the retracted position R wherein the fastener F in the guide assembly 62 is aligned to both the tool bit 36 and the tubular collar 112 in the nose piece 76. Actuation of the primary trigger 32 causes the piston 30 (FIG. 4) to reciprocate in the cylinder 28 (FIG. 4) and strike the tool bit 36. As the fastener feed mechanism 16 is slidably mounted to the rivet gun 24, rearward movement of the fastener feed mechanism 16 permits the tool bit 36 to impact against the head H of the fastener F. As noted above, the depth limiting device 58 inhibits rearward movement of the fastener feed mechanism 16 beyond a predetermined threshold and as such, the depth of the fastener F can be maintained at a predetermined maximum depth relative to a predetermined datum on the housing assembly 50, such as the front surface 350 of the nose piece 76. As the tool bit 36 is perishable and will wear over time, the depth limiting device 58 may be employed to compensate for wear.

Figure 26:
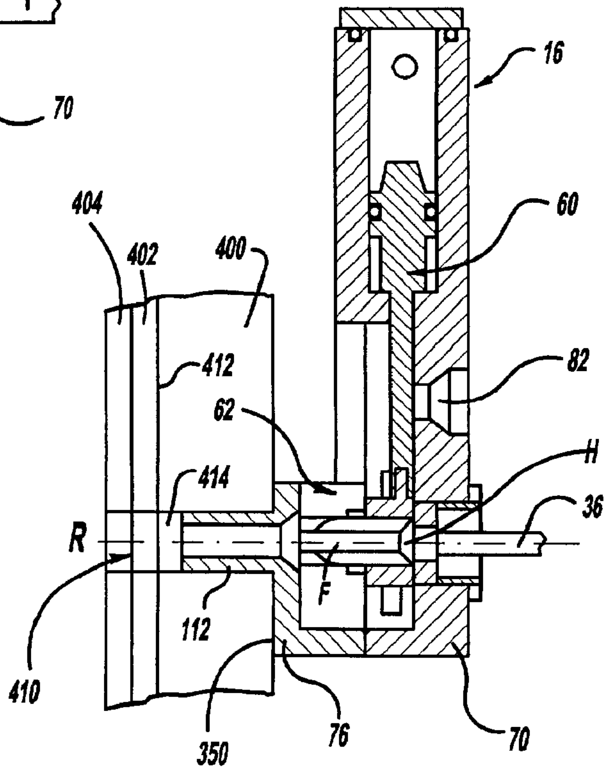
FIG. 26 is another sectional view similar to that of FIG. 7 but illustrating the guide assembly aligning a fastener to the tool bit and the tubular collar to permit the fastener to be inserted to a workpiece.
Figure 27:
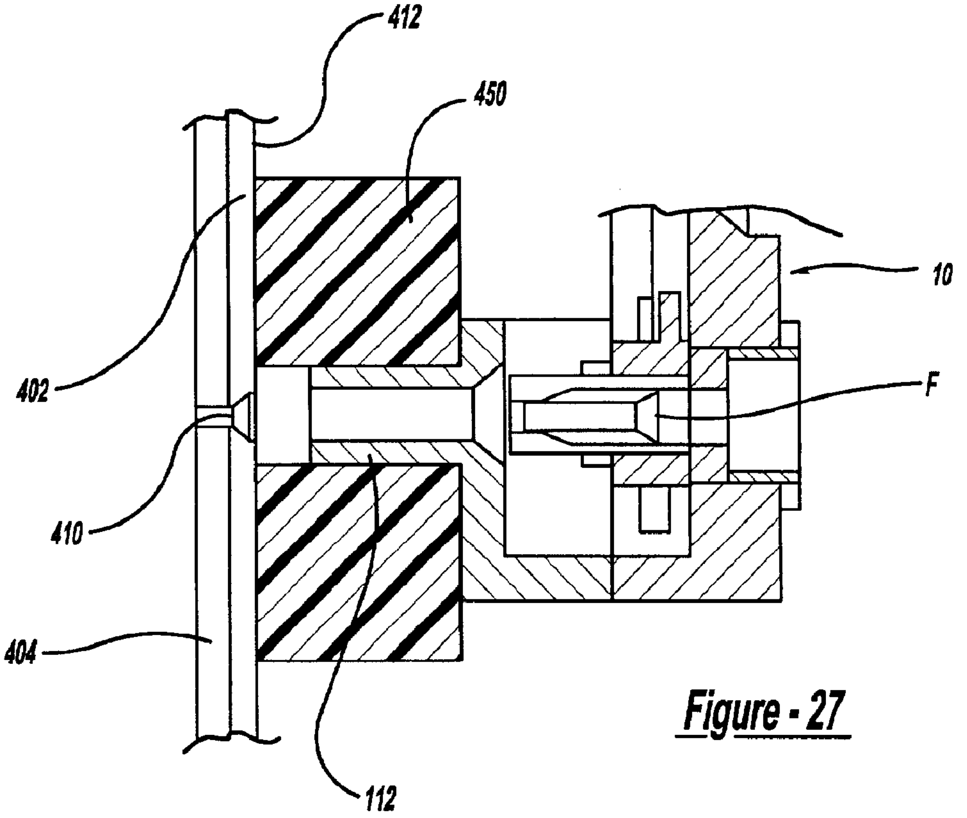
FIG. 27 is a partial sectional view similar to that of FIG. 26 but illustrating the fastener installation tool in conjunction with a bumper rather than a drill plate.

With reference to FIGS. 1 and 26, the fastener installation tool 10 is shown in operative association with a drill plate 400, a first workpiece 402 and a second workpiece 404. As those skilled in the art will understand, the drill plate 400 is employed to temporarily secure a first workpiece 402 to a second workpiece 404 through a conventional and well known clamping means, as well as to locate one or more holes 410 that are to be drilled through the first and second workpieces 402 and 404. As discussed above, the drill plate 400 is typically removed after the holes 410 are formed and thereafter fasteners F are manually inserted into the holes 410. The fastener installation tool 10, however, permits fasteners F to be fed through apertures 414 in the drill plate 400 into the holes 410 and seated to a predetermined depth prior to the removal of the drill plate 400. In this regard, the depth limiting device 58 is set such that when the front surface 350 of the nose piece 76 is abutted against the drill plate 400 and the fastener feed mechanism 16 is pushed rearward and into contact with the depth limiting device 58, the tool bit 36 is permitted to impact the head H of the fastener F until the head H is offset from the surface 412 of the first workpiece 402 such that a predetermined amount of clearance, such as about 0.010 inch to about 0.040 inch, exists between the head H and the surface 412 of the first workpiece 402. Installation of the fastener F in this manner ensures that the surface 412 of the first workpiece 402 will not become damaged as a result of contact between the head H of the fastener F or any portion of the fastener installation tool 10.

In situations where the use of a drill plate 400 is unnecessary or undesirable, a bumper 450 may be fitted to the tubular collar 112 of the fastener installation tool 10 to both establish a datum that determines the depth to which the fastener F is set and to protect the surface 412 of the first workpiece 402.

In another preferred form, the present invention provides a method for coupling a first workpiece 402 to a second workpiece 404. The method includes: providing a drill plate 400 having an aperture 414; aligning the drill plate 400 to the first and second workpieces 402 and 404 such that the aperture 414 is positioned in a predetermined manner relative to at least one of the first and second workpieces 402 and 404; securing the drill plate 400 to the first and second workpieces 402 and 404 such that the drill plate 400 abuts the surface 410 of the first workpiece 402; forming a hole 410 through the first and second workpieces 402 and 404, the hole 410 being aligned in a predetermined manner relative to the aperture 414 in the drill plate 400; providing a threaded fastener F having a head H; inserting the threaded fastener F into the aperture 414 and the hole 410; and impacting the head H of the threaded fastener F with a reciprocating fastener installation tool 10 until the head H is offset from the surface 412 of the first workpiece 402 such that a predetermined amount of clearance exists between the head H and the surface 412 of the first workpiece 402. As those skilled in the art will appreciate, the step of providing the threaded fastener F and the step of inserting the threaded fastener F may be performed substantially simultaneously or sequentially.

Figure 28:
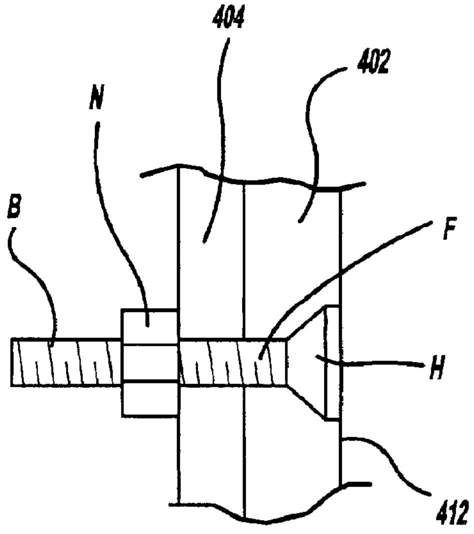
FIG. 28 is a sectional view of a workpiece after the fastener has been installed and a coupling member has been threadably engaged to a threaded portion of the fastener.

The method also preferably includes: engaging a threaded coupling member N (FIG. 28), such as a nut, to a threaded body B of the threaded fastener F; and rotating at least one of the threaded coupling member N and the threaded fastener F to draw the head H of the fastener F into abutment with the surface 412 of the first workpiece 402.

The method also preferably includes: removing the drill plate 400 from the first and second workpieces 402 and 404 after the head H of the fastener F is abutted against the surface 412 of the first workpiece 402.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A fastener installation tool for feeding a threaded fastener through a hole formed in a workpiece, the threaded fastener including a head, the fastener installation tool comprising:

a tool body having a reciprocating portion, the reciprocating portion being aligned along a longitudinal axis of the tool body;

a magazine assembly coupled to the tool body and having a dispensing end that is aligned to an axis that is parallel to the longitudinal axis of the tool body, the magazine assembly being configured to hold at least the threaded fastener and to dispense the threaded fastener into the dispensing end;

a fastener feed mechanism coupled to the tool body and the magazine assembly, the fastener feed mechanism including a fastener gripper that is movable between an extended condition, wherein the fastener gripper is aligned to the dispensing end of the magazine assembly along said parellel axis to receive the fastener, and a retracted condition, wherein the fastener gripper is aligned to the reciprocating portion such that a longitudinal axis of the threaded fastener is coincident with the longitudinal axis of the tool body; and a controller that controls the fastener feed mechanism and is operable in a first condition, which maintains the fastener gripper in the retracted condition, and a second condition, which maintains the fastener gripper in the extended condition.

2. The fastener installation tool of claim 1, further comprising a drill plate that is coupled to the workpiece, the drill plate having an aperture that is aligned in a predetermined manner relative to the hole in the workpiece, the reciprocating portion contacting the drill plate to inhibit the fastener installation tool from driving the head of the fastener into abutment with the workpiece.

3. The fastener installation tool of claim 2, wherein the reciprocating portion is configured to contact the drill plate such that the head of the fastener is offset from the workpiece by about 0.010 inch to about 0.040 inch.

4. The fastener installation tool of claim 1, wherein the reciprocating portion includes a cushion that prevents the reciprocating portion of the tool body from contacting the workpiece.

5. The fastener installation tool of claim 4, wherein the cushion is formed from a resilient material.

6. The fastener installation tool of claim 5, wherein the resilient material is urethane.

7. A fastener installation tool for feeding a threaded fastener through a hole formed in a workpiece comprising:

a tool body having a reciprocating portion aligned along a longitudinal axis of the tool body;

a magazine assembly having a dispensing end that is aligned to an axis that is parallel to the longitudinal axis of the tool body, said magazine assembly operable to transport at least one threaded fastener to said dispensing end;

a fastener feed mechanism mounted to the body having a guide assembly movable between an extended position in which the guide assembly is positioned at the dispensing end along said parellel axis to receive the fastener and a retracted position in which the guide assembly is positioned at the reciprocating portion to align the fastener with the reciprocating portion; and a controller that controls the position of the guide assembly.

8. The fastener installation tool of claim 7, further comprising a drill plate that is coupled to the workpiece, the drill plate having an aperture that is aligned in a predetermined manner relative to the hole in the workpiece, the reciprocating portion contacting the drill plate to inhibit the fastener installation tool from driving the head of the fastener into abutment with the workpiece.

9. The fastener installation tool of claim 7, wherein the reciprocating portion includes a bumper that prevents the reciprocating portion from contacting the workpiece.

* * * * *